Patented Jan. 26, 1926.

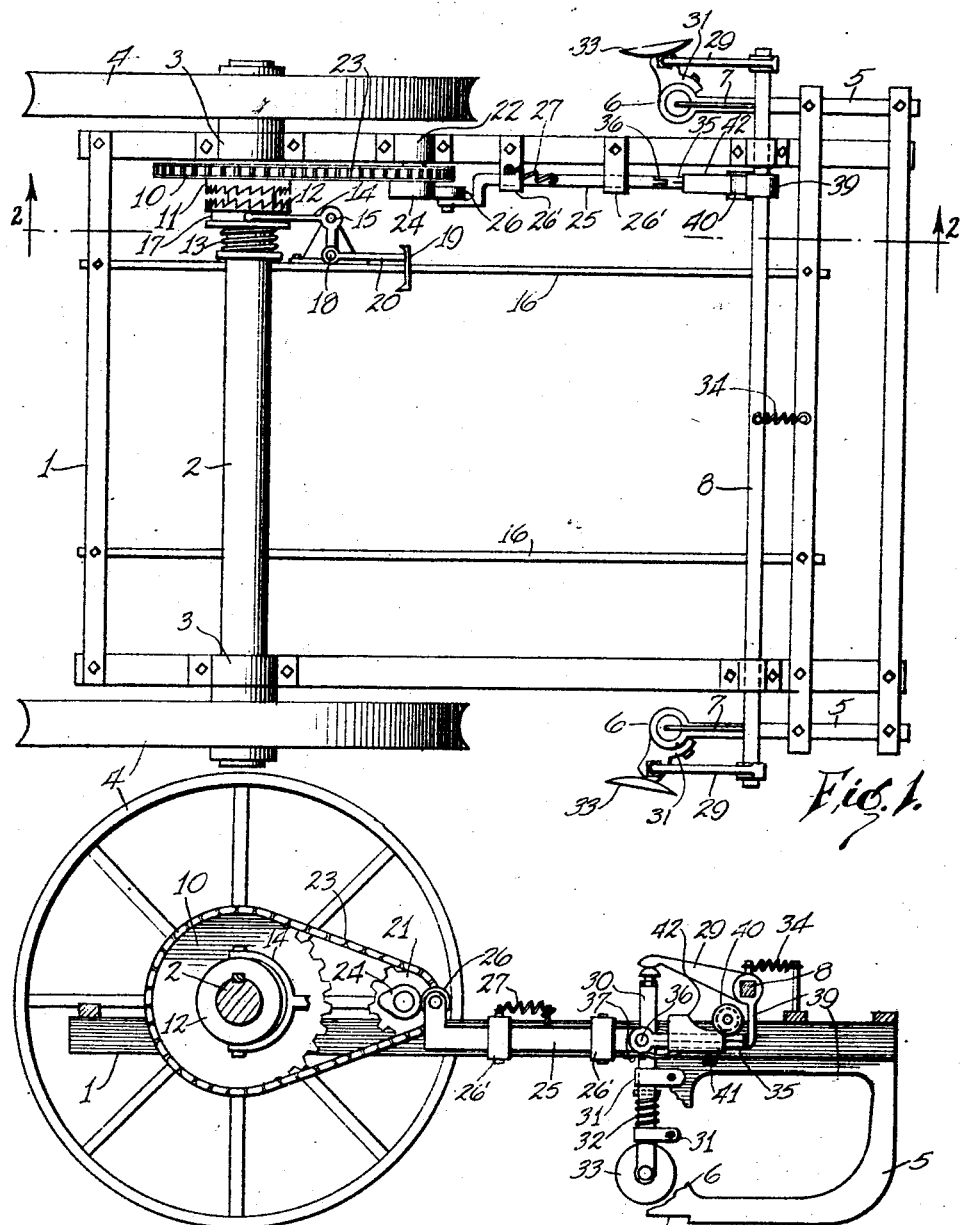

1,570,773

UNITED STATES PATENT OFFICE.

JOSEPH PAUL OESCHGER, OF CHICAGO, AND EDWIN STANTON JONES, OF PRINCEVILLE, ILLINOIS.

SPOT MARKER FOR CORN PLANTERS.

Application filed March 8, 1924. Serial No. 697,881.

*To all whom it may concern:*

Be it known that we, JOSEPH PAUL OESCHGER and EDWIN STANTON JONES, both citizens of the United States, and residents, respectively, of Chicago, county of Cook, State of Illinois, and Princeville, Peoria County, Illinois, have invented a new and useful Improvement in Spot Markers for Corn Planters, of which the following is a full, clear, and exact description.

Our invention relates to improvements in corn planters, and it consists in the combinations, constructions, and arrangements herein described and claimed.

An object of our invention is to provide a corn planter of the type described by means of which corn may be planted in a uniform symmetrical manner in the field without the necessity of using wires or other extraneous apparatus for guiding the planter and for checking the points at which the corn is to be planted.

We are well aware of the ordinary type of corn planter having a checking device which necessitates the use of a wire having knots or enlarged portions at regular intervals thereupon, which is stretched across the field and engages with the planter as it moved along the wire to operate the corn checker. There are many disadvantages to this type of machine, including the breaking of the wire through rust, and the labor required to stretch the wire and move it from place to place as the rows are planted. Our present invention entirely obviates the necessity of such procedure.

A further object of our invention is to provide a device of the type described which may be adjusted at the beginning of each row if necessary without the necessity of moving the planter. This features embodies mechanism which permits the operator from his seat upon the planter to advance or retard the checking mechanism so that the row to be planted may check correctly with the preceding row.

A further object of our invention is to provide a corn planter of the type described which is efficient in operation, extremely simple in construction, and which is thoroughly practical commercially.

Other objects and advantages will appear in the following specification, and the novel features of our invention will be particularly pointed out in the appended claims.

Our invention is illustrated in the accompanying drawings, forming part of this application, in which—

Figure 1 is a top plan view of an embodiment of our invention with the seat and drive connections eliminated, and Figure 2 is a side elevation of the mechanism illustrated in Figure 1.

In carrying out our invention we make use of a frame 1 having an axle shaft rotatably mounted thereupon at 3. Supporting wheels 4 having concave rims are mounted upon the outer ends of the axle shaft 2, and serve to support the rear portion of the planter.

The forward end of the frame 1 is provided with the ordinary type of runners 5, there being one disposed in registration with each of the wheels 4 at the forward end of the frame. Suitable containers 6 are associated with the runners 5 for the purpose of holding kernels of seed corn. The construction of the part 6 is that of the ordinary type of seed corn planter, and includes a radial arm 7 carried by a checker bar 8 which causes corn to be dropped through the lower end 9 of the container 6 when the checker bar 8 is oscillated in the manner hereinafter described.

A sprocket wheel 10 is rotatably mounted upon the axle shaft 2 at one side of the frame 1. The sprocket wheel 10 has a clutch member 11 secured to one face thereof, and concentric with the shaft 2.

The complementary clutch member 12 is provided for the clutch member 11 and is feathered to the shaft 2. A compression spring 13 serves to normally hold the clutch member 12 in engagement with the clutch member 11, and thus cause the sprocket wheel 10 to turn with the shaft 2. Means for manually releasing the clutch member 12 from engagement with the member 11 is provided in a bell crank 14 mounted at 15 upon a cross rod 16 of the frame 1 and arranged to engage with a groove 17 provided on the peripheral wall of the clutch member 12. The opposite end of the bell crank 14 is pivotally connected at 18 to a clutch pedal 19 by means of the connecting rod 20. This clutch pedal 19 is arranged for actuation by the foot of the operator so as to momentarily disengage the sprocket wheel 10 from the axis 2, thus permitting the sprocket wheel 10 to be advanced or retarded manually at will.

A sprocket wheel 21 is rotatably mounted by means of a bearing member 22 with its axis in parallel relation to the axle 2. A chain 23 is provided for driving the sprocket 21 from the sprocket wheel 12.

A cam member 24 is secured to one face of the sprocket 21. A sliding member 25 having a roller 26 at one end thereof is slidably disposed upon the frame 1 by means of slideways 26'. The roller 26 is held in normal registration with the cam 24 by means of a tension spring 27 which is secured at one end to one of the slideways 26 and which is secured at its opposite end to an upwardly extending pin carried by the member 25. It will be noted from inspection of Fig. 2 that when the sprocket wheel 21 is rotated, the sliding member 25 will be reciprocated in its bearings 26'.

The ratio between the radii of the sprocket wheels 10 and 21 is such as to cause the sliding member 25 to move forward on one cycle of its reciprocal movement at every thirty-six inches ground covered. Forty-two inches is the normal distance between the rows of corn. However, it should be noted that this difference can be varied by changing the ratio of the radii of the sprocket members 10 and 21.

A pair of arms 29 is provided, one at each end of the checker bar 8, beyond the seed containers 6.

These arms 29 are arranged to bear directly upon slidably mounted vertical supporting members 30, (see Figure 2). The support of the members 30 is provided in slideways 31 secured to the outer face of the seed container 6. A compression spring 32 encompasses each of the vertical members 30 for normally elevating the members.

Each of the members 30 has a concave disc 33 rotatably mounted at the lower end thereof and arranged to dig into the ground as the checker rod 8 is rocked, and when corn is dropped through the lower end 9 of the container 6 by operation of the arm 7.

The checker rod 8 is normally held in the position shown in Figure 2 by means of the tension spring 34.

The forward end of the sliding member 25 has a push rod 35 pivotally mounted thereto at 36. A spring 37 carried by the member 25 holds the push rod 35 in the position shown in Fig. 2.

The outer end of the push rod 35 is arranged to normally engage with a depending radially extending member 39 carried by the checker rod 8 by means of which the checker rod 8 is rocked as the sliding member 25 reciprocates.

The roller 40 is rotatably mounted upon the frame 1 immediately over the outer end of the push rod 35.

A cam 42 is adjustably mounted upon the push rod 35 by means of a set screw 41. This cam 42 is arranged to engage with the roller 40 and as the sliding member 25 is moved, to cause the push rod 35 to act against the force of the spring 37 and drop out of engagement with the depending radially extending member 39 on the checker rod, thus throwing the push rod 35 out of engagement with the checker rod. The purpose of this cam 42 is to permit the limitation of the vertical movement of the vertical supporting member 30 so that the disc 33 may not dig into the ground beyond a predetermined degree.

It is well to note at the present time that the purpose of the discs 33 is to scar the ground so that the operator may ascertain precisely where the ground has been planted and thereby visually check the planting of the subsequent row.

From the foregoing description of the various parts of the device, the operation thereof may be readily understood. As the wheels 4 are drawn upon the ground, the sprocket wheel 10 will turn, actuating the cam member 24 carried by the sprocket 21. Each time that the cam member 24 moves into engagement with the roller 26 on the sliding member 25, the push rod 35 will be forced into engagement with the depending radially extending member 39 of the checker rod 8, thus causing the checker rod to be rotated in a counter clockwise direction, (see Figure 2). As the checker rod 8 rotates through a fraction of a revolution, the arms 29 will force the supporting members 30 downwardly, causing the discs 33 to engage with the ground and scar it at a point substantially in registration with the delivery valve 9 of the seed corn reservoir or container 6.

We claim:

1. A corn planter of the type described comprising a chassis having wheels, a slidable member mounted on said chassis, means associated with the wheels of said chassis for reciprocating said slidable member longitudinally as the wheels turn, a checker bar mounted for oscillation on said chassis, an arm carried by said checker bar, a vertically movable normally elevated supporting member disposed with its upper end in engagement with said arm, a scarring member disposed at the lower end of said supporting member, a radially extending member carried by said checker bar, a pivotally mounted spring retained push rod carried by said slidable member and arranged to engage with said radially extending member, a cam carried by said push rod, and a roller for engaging with said cam when said push rod is moved toward said radially extending member, whereby the push rod is moved out of engagement with the radially extending member when the slidable member bearing the push rod has moved a predetermined distance.

2. A corn planter of the type described comprising a chassis having wheels, a slidable member mounted on said chassis, means associated with the wheels of said chassis for reciprocating said slidable member longitudinally as the wheels turn, a checker bar mounted for oscillation on said chassis, an arm carried by said checker bar, a vertically movable normally elevated supporting member disposed with its upper end in engagement with said arm, a scarring member disposed at the lower end of said supporting member, a radially extending member carried by said checker bar, a pivotally mounted spring retained push rod carried by said slidable member and arranged to engage with said radially extending member, a cam carried by said push rod and arranged for adjustment longitudinally of said push rod, and a roller for engaging with said cam when said push rod is moved toward the radially extending member, whereby the push rod is moved on its pivotal support out of engagement with the radially extending member when the slidable member bearing the push rod is moved a predetermined distance.

EDWIN STANTON JONES.
JOSEPH PAUL OESCHGER.